(12) United States Patent
Baby et al.

(10) Patent No.: US 10,186,891 B2
(45) Date of Patent: Jan. 22, 2019

(54) METHOD TO REUSE THE PULSE DISCHARGE ENERGY DURING LI-ION FAST CHARGING FOR BETTER POWER FLOW EFFICIENCY

(71) Applicant: Intel Corporation, Santa Clara, CA (US)

(72) Inventors: Anil Baby, Bangalore (IN); Subbarami Reddy Lella, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 26 days.

(21) Appl. No.: 15/283,730

(22) Filed: Oct. 3, 2016

(65) Prior Publication Data

US 2018/0097391 A1    Apr. 5, 2018

(51) Int. Cl.
*H01M 10/44* (2006.01)
*H01M 10/46* (2006.01)
*H02J 7/00* (2006.01)
*H02J 7/34* (2006.01)

(52) U.S. Cl.
CPC .......... *H02J 7/0093* (2013.01); *H02J 7/0068* (2013.01); *H02J 7/345* (2013.01)

(58) Field of Classification Search
CPC .. H02J 2007/0067; H02J 7/0093; H02J 7/245; H02J 7/345
USPC .......................... 320/107, 139, 140, 141, 166
See application file for complete search history.

(56) References Cited

U.S. PATENT DOCUMENTS

| 2009/0121684 A1 | 5/2009 | Hussain et al. |
| 2015/0077044 A1 | 3/2015 | Berkowitz et al. |
| 2015/0372526 A1 | 12/2015 | Greening et al. |
| 2017/0005497 A1 * | 1/2017 | Sherstyuk .............. H02J 7/0068 |

FOREIGN PATENT DOCUMENTS

| WO | WO2014116212 | 7/2014 |
| WO | WO2015035384 | 3/2015 |

OTHER PUBLICATIONS

PCT/US2017/043952 Notification of Transmittal of International Search Report and Written Opinion dated Nov. 8, 2017, 14 pages.

* cited by examiner

*Primary Examiner* — Edward Tso
(74) *Attorney, Agent, or Firm* — Womble Bond Dickinson (US) LLP

(57) ABSTRACT

A battery charger for charging a battery with voltage from an input supply and method for using are disclosed. The battery charger may comprise a power path (e.g., one or more circuit stages, a step down stage, a step up stage, etc.) to drive the battery during a pulse charging sequence in a first mode and to reverse power flow from the battery when operating in a boost mode during the pulse charging sequence. An energy storage component may be coupled to the power path to capture pulse discharge energy during the pulse charging sequence when the circuit stage is operating in the boost mode.

25 Claims, 5 Drawing Sheets

METHOD TO REUSE THE PULSE DISCHARGE ENERGY DURING LI-ION FAST CHARGING FOR BETTER POWER FLOW EFFICIENCY

FIELD OF THE INVENTION

Embodiments of the present invention relate to the field of rechargeable batteries for computing systems; more particularly, embodiments of the present invention relate to capturing and reusing discharge energy that is generated during a pulse charging sequence used to charge a battery.

BACKGROUND OF THE INVENTION

Fast charging of a battery is a major requirement for any high performance portable computer systems now. Many fast charging methods are currently being used. Out of these, pulse charging is a method in which a high current charge pulse is followed by a rest period and a discharge pulse before providing another driving charge pulse in sequence. This allows quick charging without impacting battery life. There are studies that show that battery capacity is reduced by 25% with conventional direct current (DC) charging compared to pulse charging when charged at the same rate after 750 cycles.

The discharge pulse in pulse charging helps proper distribution of charges within the cell and keeps the battery impedance at a minimum before the next high current charge pulse is applied. Without a preceding discharge pulse, the battery will operate at a higher voltage during charging, dissipate more power, and keep the battery at higher temperature. This can lead to dendrites outgrowth, metallic crystal formation and an increase in the internal resistance of the battery, which in turn leads to heat generation, poor battery charge efficiency, poorer battery capacity and shorter battery lifespan.

The size discharge pulses are usually approximately 2% of the duration of the charge pulse but more than twice the amplitude of the charge pulse. Recently released chargers that support fast charging use an external power dissipating resistor combined with a series switch to implement the discharge pulse. The power that needs to be dissipated by such a circuit can be 5% or more of the charging power itself. This puts considerable burden on the thermal solution that may be already operating at the boundary during fast charging. This can also limit the charging rate to a lower level due to the skin temperature and the battery temperature limitations due to the overall system losses and the losses in the battery itself.

Most of today's portable computing devices with a 1S battery use a step down type charger that takes input power from a standard Universal Serial Bus (USB) or USB Type-C connector. It also has a reverse boost feature to supply power back to the USB port from the battery in case a slave device is connected to the USB port. This is normally known as a reverse boost function. The same power path that drives the battery and system is used for the reverse power in boost mode. High conversion efficiency is possible due to the use of the same high power path.

High power computing devices such as Ultrabooks, 2-in-1s and workstations usually go with either a 2S, 3S or 4S battery. With USB-C getting the traction, there is a need for buck boost type chargers that can take input voltages from 4.5V to 21V and regulate the output voltage to the 2S-4S battery voltage range. The buck boost charger inherently supports the power flow in either direction irrespective of the voltage levels on either side.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques are disclosed to reuse the discharge energy generated during a pulse charging sequence. In one embodiment, this is accomplished without adding any extra active components to the system while reducing the power losses by greater than 25% (based on typical 10% conversion losses in a typical charger and 5% or more losses in a passive discharge circuit).

More specifically, in the pulse charging method, a part of the energy from battery gets dissipated in the resistor (e.g., FET) during use of the discharge pulse. Using a reverse power flow feature, the energy from battery during the discharge pulse of the pulse charging sequence can be captured and stored in an energy storage component (e.g., the charger input capacitor) instead of dissipating it. This stored energy is then used to charge the battery during the next charging pulse.

Figure 1:
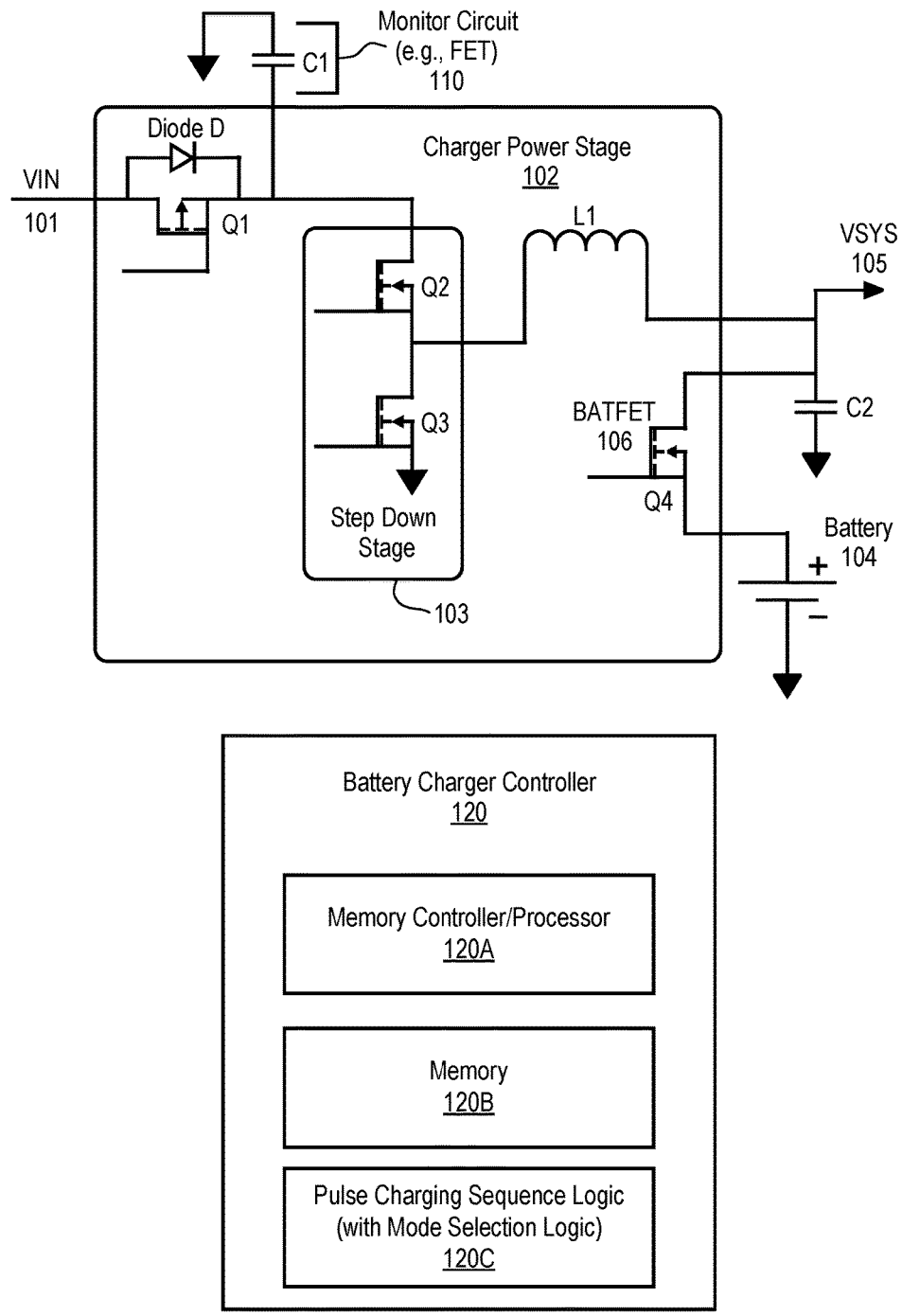
FIG. 1 is one embodiment of a battery charger circuit.
Figure 2:
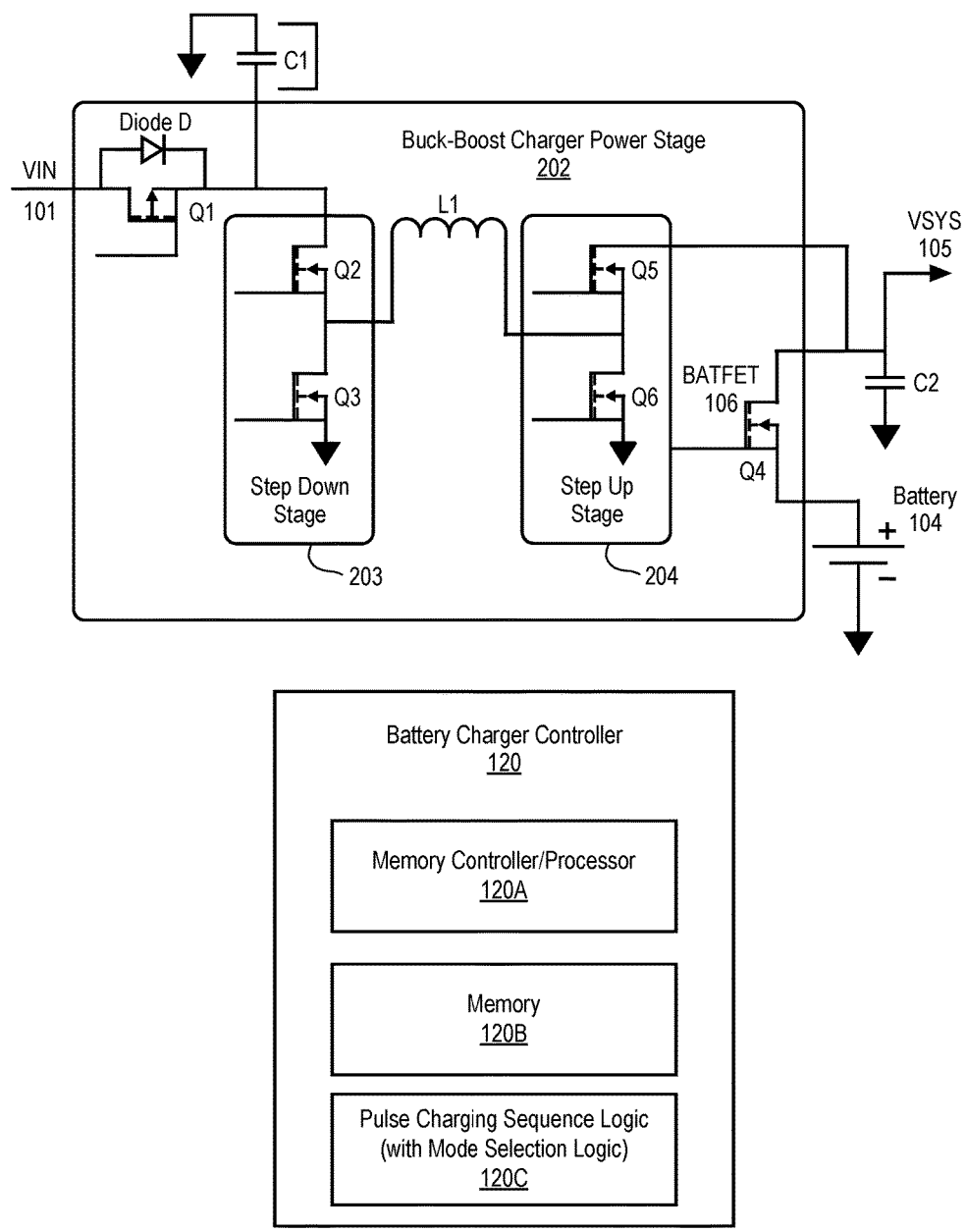
FIG. 2 is one embodiment of a buck-boost charger power circuit.

In one embodiment, existing charger components are used to capture discharged energy. In one embodiment, the input capacitor of a battery charger, which already functions to isolate the input supply from the battery, is used to capture the discharge energy. However, in one embodiment, the value of this capacitor is increased. This is shown as capacitor C1 in FIGS. 1 and 2. Other sizes of capacitors could be used. Note that while FIGS. 1 and 2 show capacitor C1 as a single capacitor, it may be implemented as a number of capacitors coupled in parallel. Existing solutions waste the discharge power whereas this idea reuses most of the discharge power, and thus is a greener solution. The effective efficiency improvement can be in the range of 4%. In one embodiment, the disclosed techniques dissipate 25% less heat, which causes the charging to be much faster for a given thermal solution (which are governed by skin temperature limit and battery temperature limit).

A battery charger is disclosed for charging a battery with voltage from an input supply. In one embodiment, the battery charger comprises a power path to drive the battery during a pulse charging sequence in a first mode and to reverse power flow from the battery when operating in a boost mode during the pulse charging sequence and an energy storage component (e.g., a capacitor) coupled to the power path to capture pulse discharge energy during the pulse charging sequence when the circuit stage is operating in the boost mode. In one embodiment, a capacitor used to capture the pulse discharge energy is the input capacitor of the battery charger that isolates and provides decoupling to the input supply used to charge the battery that is coupled to the battery charger. Thus, the capacitor servers two functions.

In one embodiment, the power path comprises a step down stage operable to convert an input voltage from the input supply to a battery voltage level in one mode and operates in another mode (e.g., the boost mode) during discharge pulsing of the pulse charging sequence to reverse the power flow to be from the battery. In one embodiment, the step down stage comprises a pair of transistor that are controlled by a controller to change their switching pattern during the discharge pulsing to allow the energy storage component (e.g., capacitor) to be charged with the pulse discharge energy. In one embodiment, the step down stage continues in boost mode until charge on the energy storage component reaches a threshold (e.g., a maximum allowed charge level for the energy storage component) or discharge pulsing has completed.

FIG. 1 is one embodiment of a battery charger circuit. Referring to FIG. 1, the battery charger circuit includes a power circuit in a step down type charger integrated circuit (IC), with a step down charger stage 103. Input supply VIN 101 is coupled to metal-oxide-semiconductor field-effect transistor (MOSFET) Q1. In one embodiment, VIN 101 is from Universal Serial Bus (USB) port or Alternating Current (AC) brick. MOSFET Q1 connects VIN 101 to charger step down stage 103 made of MOSFETs Q2 and Q3. Operating in converter mode, charger step down stage 103 converts the input voltage (e.g., 5V, 12V) to the battery voltage level to control the charge current during the pulse charging sequence.

Charger step down stage 103 is coupled, via inductor L1, to the voltage supply path VSYS 105, capacitor C2 and battery switch 106. Battery switch 106 is used to couple battery 104 to VSYS 105 and to input VIN 101. In one embodiment, switch 106 comprises MOSFET Q4, referred to as BATFET. Thus, when providing charge to battery 104, the power path goes from VIN 101 to battery 104 via MOSFET Q1, step down stage 103, inductor L1, and MOSFET Q4.

The function of MOSFET Q1 (body diode D shown) is to block reverse current from battery 104 through body diode D of MOSFET Q2. That is, MOSFET Q1 isolates and provides decoupling between VIN 101 and battery 104. The same buck converter works as a reverse boost converter with source as battery 104 to a load connected to VIN 101.

During the pulse charging sequence, when the battery discharge pulse from battery 104 needs to be applied, the converter mode is changed to reverse boost mode and the required current is drawn from battery 104. During this time, MOSFET Q1 is kept off. Energy taken from battery 104 in boost mode charges capacitor C1 to a higher voltage than VIN 101. In one embodiment, the size of capacitor C1 is adequate to hold the discharge energy and keep the voltage within the VINmax limit of the charger with margin. Capacitor C1 is already used in chargers but will be smaller in value in those charges as it only needs to filter the switching frequency.

In one embodiment, the charger continues in boost mode until the charge on capacitor C1 reaches a threshold level or the discharge cycle has completed, whichever occurs first. In one embodiment, the threshold is the maximum allowed charge level of capacitor C1. In one embodiment, the battery charger includes a monitor circuit 110 (e.g., transistor (FET), resistor, etc.) to monitor voltage across capacitor C1 to determine if its charge level has reached the threshold.

In one embodiment of a phone implementation, capacitor C1 comprises 2×10 uF, 10V capacitors. In another embodiment of a phone implementation, capacitor C1 comprises 2×47 uF, 16V capacitors. These are merely examples and capacitors of other sizes may be used.

During the next charge pulse, the energy stored in capacitor C1 from the discharge pulse is used to charge battery 104 in buck converter mode. During this time, capacitor C1 discharges and the body diode of MOSFET Q1 becomes forward biased, eventually allowing power to be drawn from VIN 101. MOSFET Q1 is turned on quickly at this time to prevent power loss in body diode D. In one embodiment, more than 80% of the energy can be recovered assuming both boost and buck conversions occur at 90% efficiency. Thus, the same step down stage is used in two different modes, one of which allows discharge energy to be captured for further charging of battery 104.

FIG. 1 also includes a battery charger controller 120. In one embodiment, battery charger controller 120 includes at least a microcontroller/processor 120A, memory 120B, pulse charging sequence logic 120C. Pulse charging sequence logic 120C controls the sequencing used to perform the pulse charging of battery 104. Note that in another embodiment this is a simple logic circuit, such as those seen in mixed signal integrated circuits (ICs), with some basic memory and basic processing needed.

In one embodiment, the battery charger performs reverse power flow with a buck-boost charger configuration, such as those buck-boost chargers currently being used for a Type-C connector based higher power charging.

FIG. 2 is one embodiment of a buck-boost charger power circuit. Referring to FIG. 2, buck-boost charger power stage 202 is coupled to voltage supply VIN 101, system voltage supply output VSYS 105, and battery 104. In one embodiment, buck-boost charger power stage 202 allows power flow in either direction irrespective of the voltage levels on either side and can work in buck-boost mode in either direction.

Buck-boost charger power stage 202 includes a step down stage 203 coupled to a step up stage 204 via inductor L1. Step down stage 203 is coupled to VIN 101 via diode D and MOSFET Q1. Capacitor C1 is coupled to MOSFET Q1 and step down stage 203. Step up stage 204 is coupled to VSYS 105, capacitor C2 and battery 104 (via MOSFET Q4, referred to as BATFET 106).

The same working principle explained for step down type chargers above is applicable for this also. Whenever a discharge pulse is needed, MOSFET Q1 is turned off and the converter power flow is reversed. When the power flow is reversed, capacitor C1 charges to the maximum allowed voltage by drawing energy from battery 104. This is followed by a charge pulse of the pulse charging sequence while MOSFET Q1 is off. Capacitor C1 will discharge and MOSFET Q1 body diode D will turn on. At this time, MOSFET Q1 can be turned ON. The charge pulse of the pulse charging sequence can be followed by a rest period.

In one embodiment, the size of capacitor C1 can be further reduced if MOSFET Q1 is a back-to-back FET that can block power flow in either direction. In one embodiment, MOSFET Q1 is turned off before the rest period, allowing charge pulse to discharge all the energy from capacitor C1. This will allow a bigger discharge pulse for a given capacitor C1 value. Once capacitor C1 is charged, the body diode D path can be enabled by turning ON one of the FETs. The discharge pulse can start and MOSFET Q1 can be turned on fully once the body diode D of MOSFET Q1 starts to conduct.

Note that the use of a back-to-back FET case for reducing the size of capacitor C1 is also possible for the step down type chargers, such as, for example, the step down charger described in FIG. 1.

Note that in one embodiment, the internal compensation and feedback control circuits for boost and buck modes will be different. Switching between discharge and charge modes can become slow due to the charging/discharging of compensation capacitors to settled values. This can be solved by the use of digital feedback control or the use switches to isolate and retain the charge in compensation capacitors and connect respective capacitors back at the start of each mode, both of which are known in the art.

Figure 3:
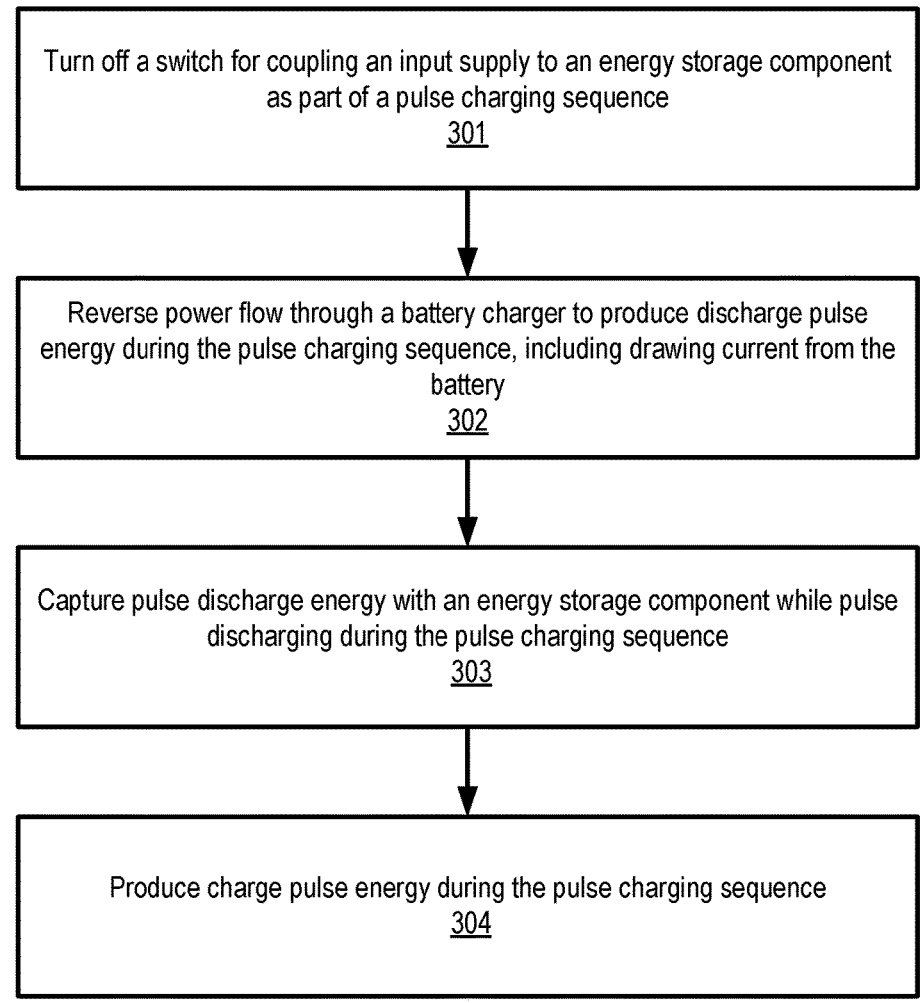
FIG. 3 is a flow diagram of one embodiment of a battery charging process.

FIG. 3 is a flow diagram of one embodiment of a battery charging process. In one embodiment, the process is performed by processing logic that may comprise hardware (circuitry, dedicated logic, etc.), software (such as is run on a general purpose computer system or a dedicated machine), firmware, or a combination of the three.

Referring to FIG. 3, the process begins by turning off a switch for coupling an input supply to an energy storage component as part of a pulse charging sequence (processing block 301). In one embodiment, this occurs when using a reverse boost converter in the battery charger.

After turning off the switch, power flow through a battery charger is reversed to produce discharge pulse energy during the pulse charging sequence, including drawing current from the battery (processing block 302).

Next, pulse discharge energy is captured with an energy storage component while pulse discharging during the pulse charging sequence (processing block 303). In one embodiment, energy storage component comprises an input capacitor operable to isolate and provide decoupling to an input supply using to provide voltage that is used to charge the battery.

In one embodiment, the energy storage component is charged with the discharge pulse energy until a charge level on the energy storage component reaches a threshold or discharge pulsing of the pulse charging sequence has completed. In one embodiment, the threshold comprises a maximum allowed charge level for the energy storage component.

Subsequently, charge pulse energy is produced during the pulse charging sequence (processing block 304).

In one embodiment, the charge pulse energy is produced by a buck converter and the discharge pulse energy is produced by a reverse boost converter, and the buck converter and reverse boost converter are implemented with a step down circuit stage. In another embodiment, the charge pulse energy is produced by a buck converter and the discharge pulse energy is produced by a reverse boost converter, and the buck converter and reverse boost converter are implemented with step down and step up circuit stages.

Figure 4:
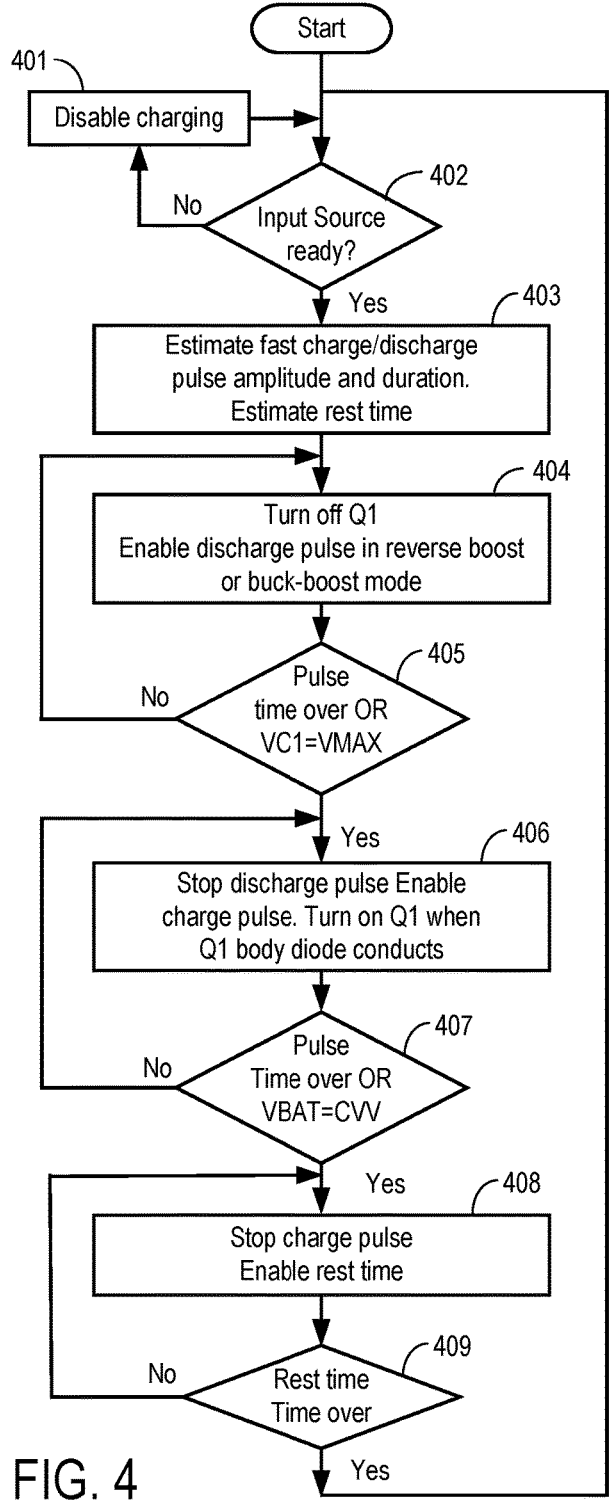
FIG. 4 is another flow diagram depicting one embodiment of Discharge-Charge-Rest sequence.

FIG. 4 is another flow diagram depicting one embodiment of Discharge-Charge-Rest sequence. In one embodiment, the process is performed by processing logic that may comprise hardware (circuitry, dedicated logic, etc.), software (such as is run on a general purpose computer system or a dedicated machine), firmware, or a combination of the three.

Note that many other implementations are possible based on what is suitable to battery chemistry and fabrication. Techniques described herein are a low cost and high efficiency discharge pulse implementation. Also note that some of the other normal features associated with fast/normal charging have not been described to avoid obscuring the invention. For example, if the battery is in dead battery, fast charging can start only after trickle charging is performed until a certain charge level after power is available.

Referring to FIG. 4, the process begins with the battery charger waiting for the input power to be ready. At this stage, process logic tests whether the input supply (source) is ready (processing block 402). If it is not, the process disables charging (processing block 401) and transitions back to the beginning of processing block 402.

When input power is ready, processing logic determines the charge/discharge and rest sequence (processing block 403). In one embodiment, this includes estimating the fast charge and discharge amplitude and duration and estimating the rest time. In one embodiment, these parameters are fixed in some cases where the processor can readily use it. But in some cases like Type-C charging, the input power capability depends on the Type-C source. These parameters needs to be adjusted in that case depending on the source power capability. In one embodiment, this is performed by the charger. In other embodiments, this is performed by embedded controller firmware or system software.

After determining the charge/discharge and rest sequence, processing logic in the charger turns off MOSFET Q1 and enables a discharge pulse in reverse boost mode (FIG. 1) or buck-boot mode (FIG. 2) (processing block 404). The discharge pulse prepares the battery for a high current charge pulse. The charger turns off MOSFET Q1 before the discharge pulse is applied to allow capacitor C1 to capture and store the discharge energy.

In one embodiment, the discharge pulse continues until the estimated discharge time or until capacitor C1 voltage reaches the maximum allowed level. Processing logic tests whether discharge pulse time has ended or the voltage on capacitor C1 (VC1) is greater than its maximum allowed level (VMAX) (processing block 405). If it is, the process transitions to processing block 406; if not, the process transitions to processing block 404.

At processing block 406, processing logic stops the discharge pulse and, after the discharge pulse has ended, enables a charge pulse to be applied to battery. This discharges capacitor C1. Then processing logic turns on MOSFET Q1 when the body diode D of MOSFET Q1 conducts.

Processing logic determines whether the charge pulse has ended or the battery has reached its Constant Voltage Charging Voltage (CVV) level (processing block 407). If not, the process transitions back to processing block 406. If the charge pulse has ended or the battery has reached its CVV level, the process transitions to processing block 408 where processing logic stops the charge pulse and enables a rest period (time). During this time both charge and discharge are off. This allows battery to evenly distribute the charge.

Subsequently, processing logic determines whether the rest time is over (processing block 409). If it is not, the process transitions to processing block 408; if it has, the process transitions back to processing block 402.

Figure 5:
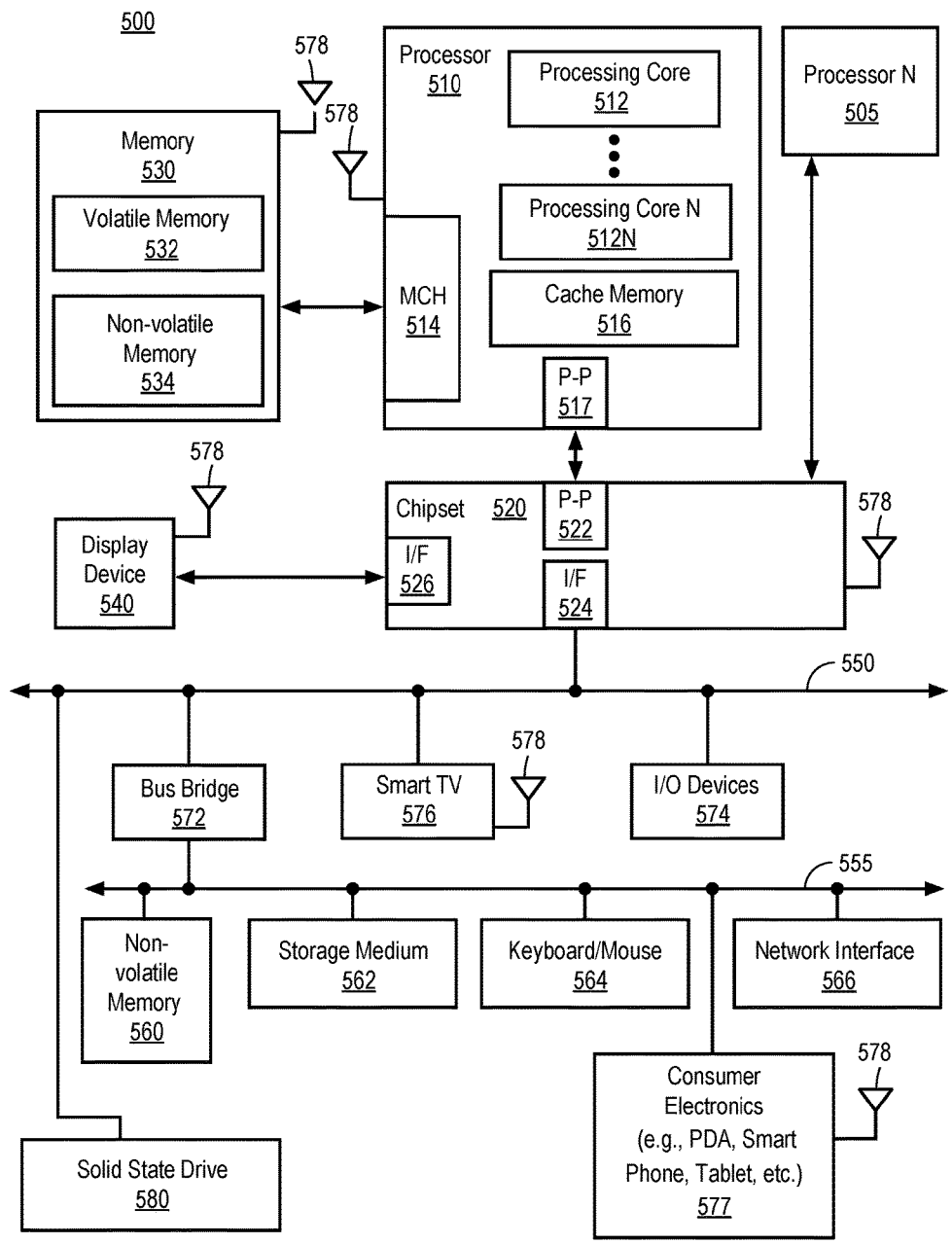
FIG. 5 is a block diagram of one embodiment of a computing system.

FIG. 5 is one embodiment of a system level diagram 500 that may incorporate the techniques described above. For example, the techniques described above may be used in conjunction with a processor in system 500 or other part of system 500.

Referring to FIG. 5, system 500 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 500 implements the methods disclosed herein and may be a system on a chip (SOC) system.

In one embodiment, processor 510 has one or more processor cores 512 to 512N, where 512N represents the Nth processor core inside the processor 510 where N is a positive integer. In one embodiment, system 500 includes multiple processors including processors 510 and 505, where processor 505 has logic similar or identical to logic of processor 510. In one embodiment, system 500 includes multiple processors including processors 510 and 505 such that processor 505 has logic that is completely independent from the logic of processor 510. In such an embodiment, a multi-package system 500 is a heterogeneous multi-package system because the processors 505 and 510 have different logic units. In one embodiment, processing core 512 includes, but is not limited to, pre-fetch logic to fetch instructions, decode logic to decode the instructions, execution logic to execute instructions and the like. In one embodiment, processor 510 has a cache memory 516 to cache instructions and/or data of the system 500. In another embodiment of the invention, cache memory 516 includes level one, level two and level three, cache memory, or any other configuration of the cache memory within processor 510.

In one embodiment, processor 510 includes a memory control hub (MCH) 514, which is operable to perform functions that enable processor 510 to access and communicate with a memory 530 that includes a volatile memory 532 and/or a non-volatile memory 534. In one embodiment, memory control hub (MCH) 514 is positioned outside of processor 510 as an independent integrated circuit.

In one embodiment, processor 510 is operable to communicate with memory 530 and a chipset 520. In such an embodiment, SSD 580 executes the computer-executable instructions when SSD 580 is powered up.

In one embodiment, processor 510 is also coupled to a wireless antenna 578 to communicate with any device configured to transmit and/or receive wireless signals. In one embodiment, wireless antenna interface 578 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 534 includes, but is not limited to, flash memory (e.g., NAND, NOR), phase change memory (PCM), read-only memory (ROM), electrically erasable programmable read-only memory (EEPROM), or any other type of non-volatile memory device.

Memory 530 stores information and instructions to be executed by processor 510. In one embodiment, chipset 520 connects with processor 510 via Point-to-Point (PtP or P-P) interfaces 517 and 522. In one embodiment, chipset 520 enables processor 510 to connect to other modules in the system 500. In one embodiment, interfaces 517 and 522 operate in accordance with a PtP communication protocol such as the Intel QuickPath Interconnect (QPI) or the like.

In one embodiment, chip set 520 is operable to communicate with processor 510, 505, display device 540, and other devices 572, 576, 574, 560, 562, 564, 566, 577, etc. In one embodiment, chipset 520 is also coupled to a wireless antenna 578 to communicate with any device configured to transmit and/or receive wireless signals.

In one embodiment, chip set 520 connects to a display device 540 via an interface 526. In one embodiment, display device 540 includes, but is not limited to, liquid crystal display (LCD), plasma, cathode ray tube (CRT) display, or any other form of visual display device. In addition, chipset 520 connects to one or more buses 550 and 555 that interconnect various modules 574, 560, 562, 564, and 566. In one embodiment, buses 550 and 555 may be interconnected together via a bus bridge 572 if there is a mismatch in bus speed or communication protocol. In one embodiment, chipset 520 couples with, but is not limited to, a non-volatile memory 560, a mass storage device(s) 562, a keyboard/mouse 564, and a network interface 566 via interface 524, smart TV 576, consumer electronics 577, etc.

In one embodiment, mass storage device 562 includes, but is not limited to, a solid state drive, a hard disk drive, a universal serial bus flash memory drive, or any other form of computer data storage medium. In one embodiment, network interface 566 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 5 are depicted as separate blocks within the system 500, the functions performed by some of these blocks may be integrated within a single semiconductor circuit or may be implemented using two or more separate integrated circuits.

In one example embodiment, a battery charger comprises a power path to drive the battery during a pulse charging sequence in a first mode and to reverse power flow from the battery when operating in a boost mode during the pulse charging sequence and an energy storage component coupled to the power path to capture pulse discharge energy during the pulse charging sequence when the circuit stage is operating in the boost mode.

In another example embodiment, the subject matter of the first example embodiment can optionally include that the energy storage component comprises a capacitor. In another example embodiment, the subject matter of this example embodiment can optionally include that the capacitor is an input capacitor operable to isolate and provide decoupling to the input supply when the input supply is coupled to the battery charger.

In another example embodiment, the subject matter of the first example embodiment can optionally include that the power path comprises a step down stage operable to convert an input voltage from the input supply to a battery voltage level, where the step down stage is operable in the boost mode during discharge pulsing of the pulse charging sequence to reverse the power flow to be from the battery. In another example embodiment, the subject matter of this example embodiment can optionally include that the step down stage comprises a pair of transistor that are controlled to change their switching pattern during the discharge pulsing to allow the energy storage component to be charged with the pulse discharge energy.

In another example embodiment, the subject matter of that example embodiment can optionally include that the step down stage is operable to continue in boost mode until charge on the energy storage component reaches a threshold or discharge pulsing has completed. In another example embodiment, the subject matter of the first example embodiment can optionally include that the energy storage component comprises a capacitor, and further comprising a monitor circuit to monitor voltage collected by the capacitor for determining is the capacitor has reached the threshold. In another example embodiment, the subject matter of the first example embodiment can optionally include that the threshold comprises a maximum allowed charge level for the energy storage component.

In another example embodiment, the subject matter of the first example embodiment can optionally include a step up stage coupled to the step down stage to form a buck-boost charger power stage.

In a second example embodiment, a battery charger for charging a battery with voltage from an input supply comprises: one or more circuit stages coupled together to operate as a buck converter and a reverse boost converter at different times of a pulse charging sequence, the one or more circuit stages to operate as the buck converter when the battery is being charged with a charge pulse during the pulse charging sequence and to operate as a reverse boost converter to draw current from the battery as part of pulse discharging during the pulse charging sequence; and an energy storage component coupled to the circuit stage to capture pulse discharge energy while pulse discharging during the pulse charging sequence when the circuit stage is operating as a reverse boost converter.

In another example embodiment, the subject matter of the second example embodiment can optionally include that the energy storage component comprises a capacitor. In another example embodiment, the subject matter of the second example embodiment can optionally include that the capacitor is an input capacitor operable to isolate and provide decoupling to the input supply when the input supply is coupled to the battery charger.

In another example embodiment, the subject matter of the second example embodiment can optionally include that the step down stage is operable to convert an input voltage from the input supply to a battery voltage level and comprises a pair of transistor switches that are controlled to change their switching pattern during the discharge pulsing to allow the energy storage component to be charged with the pulse discharge energy. In another example embodiment, the subject matter of this example embodiment can optionally include that the step down stage is operable as a reverse boost converter during the pulse charging sequence until charge on the energy storage component reaches a threshold or discharge pulsing has completed. In another example embodiment, the subject matter of this example embodiment can optionally include that the energy storage component comprises a capacitor, and further comprising a monitor circuit to monitor voltage collected by the capacitor for determining is the capacitor has reached the threshold. In another example embodiment, the subject matter of this example embodiment can optionally include that the threshold comprises a maximum allowed charge level for the energy storage component.

In another example embodiment, the subject matter of the second example embodiment can optionally include a switch for coupling the input supply to the energy storage component, the switch being turned off when the one or more circuit stages operate as the reverse boost converter.

In a third example embodiment, a computer system comprises: a battery; and a battery charger as defined in any one of Claims 9-15.

In a fourth example embodiment, a method for charging a battery with a battery charger comprises: reversing power flow through a battery charger to produce discharge pulse energy during a pulse charging sequence, including drawing current from the battery; capturing pulse discharge energy with an energy storage component while pulse discharging during the pulse charging sequence; and producing charge pulse energy during the pulse charging sequence.

In another example embodiment, the subject matter of the fourth example embodiment can optionally include that the charge pulse energy is produced by a buck converter and the discharge pulse energy is produced by a reverse boost converter, and the buck converter and reverse boost converter are implemented with a step down circuit stage.

In another example embodiment, the subject matter of the fourth example embodiment can optionally include that the charge pulse energy is produced by a buck converter and the discharge pulse energy is produced by a reverse boost converter, and the buck converter and reverse boost converter are implemented with step down and step up circuit stages.

In another example embodiment, the subject matter of the fourth example embodiment can optionally include that the energy storage component comprises an input capacitor operable to isolate and provide decoupling to an input supply using to provide voltage that is used to charge the battery.

In another example embodiment, the subject matter of the fourth example embodiment can optionally include charging the energy storage component with the discharge pulse energy until a charge level on the energy storage component reaches a threshold or discharge pulsing of the pulse charging sequence has completed. In another example embodiment, the subject matter of this example embodiment can optionally include that the threshold comprises a maximum allowed charge level for the energy storage component.

In another example embodiment, the subject matter of the fourth example embodiment can optionally include turning off a switch for coupling the input supply to the energy storage component when using a reverse boost converter.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A battery charger for charging a battery with voltage from an input supply, the battery charger comprising:
    a power path to drive the battery during a pulse charging sequence in a first mode and to reverse power flow from the battery when operating in a boost mode during the pulse charging sequence; and
    an energy storage component coupled to the power path to capture pulse discharge energy during the pulse charging sequence when the power path is operating in the boost mode.

2. The battery charger defined in claim 1 wherein the energy storage component comprises a capacitor.

3. The battery charger defined in claim 2 wherein the capacitor is an input capacitor operable to isolate and provide decoupling to the input supply when the input supply is coupled to the battery charger.

4. The battery charger defined in claim 1 wherein the power path comprises a step down stage operable to convert an input voltage from the input supply to a battery voltage level, the step down stage operable in the boost mode during discharge pulsing of the pulse charging sequence to reverse the power flow to be from the battery.

5. The battery charger defined in claim 4 wherein the step down stage comprises a pair of transistors that are controlled to change their switching pattern during the discharge pulsing to allow the energy storage component to be charged with the pulse discharge energy.

6. The battery charger defined in claim 4 wherein the step down stage is operable to continue in boost mode until charge on the energy storage component reaches a threshold or discharge pulsing has completed.

7. The battery charger defined in claim 6 wherein the energy storage component comprises a capacitor, and further comprising a monitor circuit to monitor voltage collected by the capacitor for determining the capacitor has reached the threshold.

8. The battery charger defined in claim 6 wherein the threshold comprises a maximum allowed charge level for the energy storage component.

9. The battery charger defined in claim 4 further comprising a step up stage coupled to the step down stage to form a buck-boost charger power stage.

10. A battery charger for charging a battery with voltage from an input supply, the battery charger comprising:
    one or more circuit stages coupled together to operate as a buck converter and a reverse boost converter at different times of a pulse charging sequence, the one or more circuit stages to operate as the buck converter when the battery is being charged with a charge pulse during the pulse charging sequence and to operate as a reverse boost converter to draw current from the battery as part of pulse discharging during the pulse charging sequence; and
    an energy storage component coupled to the circuit stage to capture pulse discharge energy while pulse discharging during the pulse charging sequence when the circuit stage is operating as a reverse boost converter.

11. The battery charger defined in claim 10 wherein the energy storage component comprises a capacitor.

12. The battery charger defined in claim 11 wherein the capacitor is an input capacitor operable to isolate and provide decoupling to the input supply when the input supply is coupled to the battery charger.

13. The battery charger defined in claim 10 wherein the one or more circuit stages comprises a step down stage that is operable to convert an input voltage from the input supply to a battery voltage level and comprises a pair of transistor that are controlled to change their switching pattern during the discharge pulsing to allow the energy storage component to be charged with the pulse discharge energy.

14. The battery charger defined in claim 13 wherein the step down stage is operable as a reverse boost converter during the pulse charging sequence until charge on the energy storage component reaches a threshold or discharge pulsing has completed.

15. The battery charger defined in claim 14 wherein the energy storage component comprises a capacitor, and further comprising a monitor circuit to monitor voltage collected by the capacitor for determining is the capacitor has reached the threshold.

16. The battery charger defined in claim 15 wherein the threshold comprises a maximum allowed charge level for the energy storage component.

17. The battery charger defined in claim 10 further comprising a switch for coupling the input supply to the energy storage component, the switch being turned off when the one or more circuit stages operate as the reverse boost converter.

18. A computer system comprising:
   a battery; and
   a battery charger as defined in any one of claims 10-17.

19. A method for charging a battery with a battery charger, the method comprising:
   reversing power flow through a battery charger to produce discharge pulse energy during a pulse charging sequence, including drawing current from the battery;
   capturing pulse discharge energy with an energy storage component while pulse discharging during the pulse charging sequence; and
   producing charge pulse energy during the pulse charging sequence.

20. The method defined in claim 19 wherein the charge pulse energy is produced by a buck converter and the discharge pulse energy is produced by a reverse boost converter, and the buck converter and reverse boost converter are implemented with a step down circuit stage.

21. The method defined in claim 19 wherein the charge pulse energy is produced by a buck converter and the discharge pulse energy is produced by a reverse boost converter, and the buck converter and reverse boost converter are implemented with step down and step up circuit stages.

22. The method defined in claim 19 wherein the energy storage component comprises an input capacitor operable to isolate and provide decoupling to an input supply when the input supply is coupled to the battery charger.

23. The method defined in claim 19 further comprising charging the energy storage component with the discharge pulse energy until a charge level on the energy storage component reaches a threshold or discharge pulsing of the pulse charging sequence has completed.

24. The method defined in claim 23 wherein the threshold comprises a maximum allowed charge level for the energy storage component.

25. The method defined in claim 19 further comprising turning off a switch for coupling the input supply to the energy storage component when using a reverse boost converter.

* * * * *